United States Patent [19]

Suminski

[11] Patent Number: 5,558,061
[45] Date of Patent: Sep. 24, 1996

[54] ENGINE CYLINDER INTAKE PORT

[75] Inventor: David W. Suminski, Warren, Mich.

[73] Assignee: General Motors Corporation, Detroit, Mich.

[21] Appl. No.: 578,002

[22] Filed: Dec. 22, 1995

[51] Int. Cl.[6] .................................................. F02B 31/00
[52] U.S. Cl. ................. 123/306; 123/188.14; 123/188.8; 123/193.2
[58] Field of Search ..................................... 123/306, 308, 123/188.14, 188.8, 193.3, 193.2

[56] References Cited

U.S. PATENT DOCUMENTS

| | | | |
|---|---|---|---|
| 3,884,209 | 5/1975 | List et al. | 123/188 M |
| 3,890,949 | 6/1975 | Elsbett et al. | 123/188 M |
| 4,015,577 | 4/1977 | Elsbett et al. | 123/188 M |
| 4,201,175 | 5/1980 | Tanaka et al. | 123/191 M |
| 4,224,918 | 9/1980 | Tanaka et al. | 123/657 |
| 4,354,463 | 10/1982 | Otani et al. | 123/308 |
| 4,606,308 | 8/1986 | Furlong | 123/188 M |
| 4,756,281 | 7/1988 | Chen et al. | 123/188.8 |
| 4,844,040 | 7/1989 | Leighton et al. | 123/188.14 |
| 4,974,566 | 12/1990 | LoRusso et al. | 123/308 |
| 5,076,224 | 12/1991 | Smith, Jr. et al. | 123/188.14 |
| 5,267,543 | 12/1993 | Novak et al. | 123/188.14 |
| 5,479,889 | 1/1996 | Sato et al. | 123/188.14 |

Primary Examiner—Erick R. Solis
Attorney, Agent, or Firm—Karl F. Barr, Jr.

[57] ABSTRACT

An internal combustion engine is disclosed having an apparatus which operates to induce cylinder charge swirl across the range of valve lift and volumetric flow. The intake system of the present invention includes a cylinder-disposed chamber shroud which extends circumferentially about a portion of the intake valve opening in the combustion chamber. The shroud operates to preferentially direct intake charge flowing into the combustion chamber to one side of the cylinder thereby inducing charge swirl. A port guide wing, disposed upstream of the intake valve opening within the intake port supplying charge to the combustion chamber, directs inlet charge to one side of the intake port under high flow conditions. The flow entering the combustion chamber primarily through one side of the valve opening induces swirl within the cylinder.

4 Claims, 4 Drawing Sheets

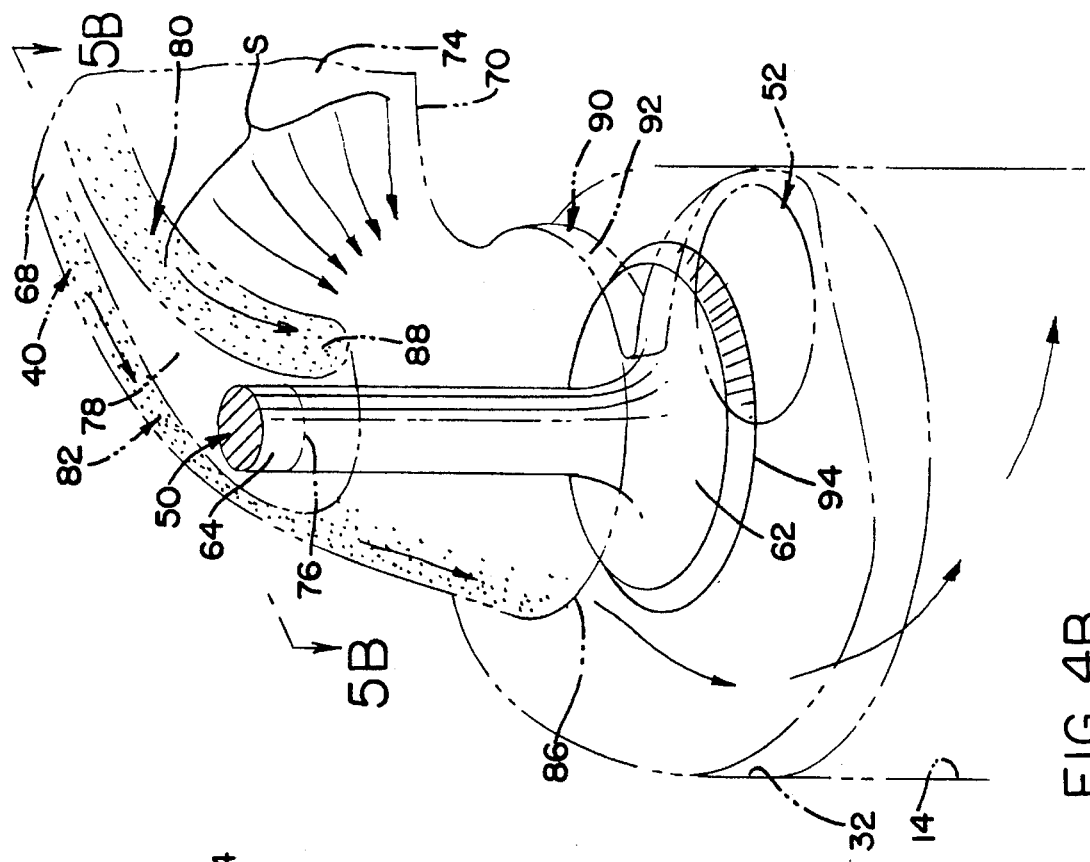
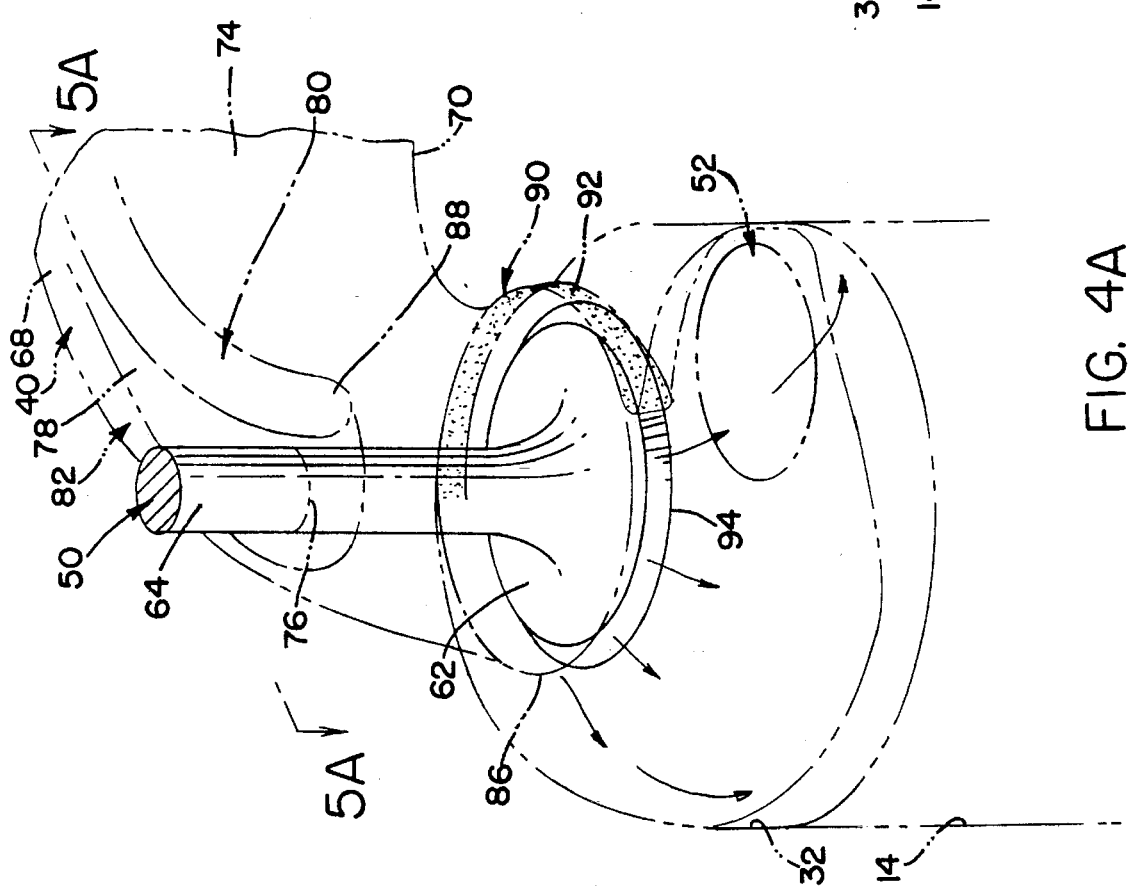
FIG. 4A
FIG. 4B 5,558,061

ENGINE CYLINDER INTAKE PORT

TECHNICAL FIELD

The invention relates to internal combustion engines and, particularly, to a cylinder intake port for such engines.

BACKGROUND

Engine cylinder intake ports, or cylinder head intake ports and the like, may be configured to induce rotation or swirl of the fuel/air intake charge as it is supplied to the combustion chamber. Generally, intake port or passage designs which are intended to induce such charge swirl lack effectiveness across the full operating or lift range of the engine intake valves. While some designs are effective to induce swirl at low valve lifts, they lose substantial effectiveness at high valve lift. Similarly, intake port designs intended to induce charge swirl at high valve lifts have had little effect on the charge flow direction at low valve lift. In general, intake port or passage configurations which have been effective in creating significant charge swirl during both low and high valve lift operation have also, due to increased resistance to flow, resulted in a reduction of the fuel/air charge mass entering each cylinder during the intake stroke, reducing the volumetric efficiency of the engine.

In view of significant interest in utilizing increased charge swirl in spark ignited internal combustion engines, such as gasoline engines used in automotive applications, a need remains for a simple, fixed geometry intake port configuration which is capable of providing substantial fuel/air charge swirl together with high volumetric charging efficiencies across the valve lift profile.

SUMMARY

The present invention is directed to a fixed geometry engine cylinder intake port and combustion chamber, for use in an internal combustion engine, having features which can provide cylinder charge swirl at both low and high degrees of valve lift combined with a high degree of cylinder charging, or volumetric efficiency.

The improved intake port construction utilizes a cylinder-disposed chamber shroud which extends circumferentially about a portion of the intake valve seat. The chamber shroud operates to preferentially direct the intake charge, entering the combustion chamber through the intake valve, within the cylinder so as to induce charge swirl therein. Shroud dimensions are defined so as to operate on the incoming charge flow during the low-lift, low flow volume portion of the valve lift profile. Entry of the intake valve into a high-lift range of operation, in which volumetric efficiency of the intake port must be maximized, the intake valve clears the chamber shroud allowing unrestricted flow through the opening in the valve seat.

In the high-lift, high flow volume, range of intake valve operation, intake charge swirl continues to be induced through the effect of an intake port guide wing disposed upstream of the valve seat opening. As flow volume increases with increasing valve lift, the guide wing operates to direct an increasing proportion of the intake charge flow to one side of the intake port and, consequently, the intake valve opening thereby inducing swirl in the intake charge entering the combustion chamber.

These and other features of the invention will become more apparent from the following detailed description and drawings.

BRIEF DESCRIPTION OF THE DRAWINGS

FIGS. 4A and 4B are partial, schematic views in perspective of the intake port and combustion chamber of FIG. 1 in differing modes of operation and illustrating intake charge flow through the intake port and into the combustion chamber.

DETAILED DESCRIPTION OF THE PREFERRED EMBODIMENT

Figure 1:
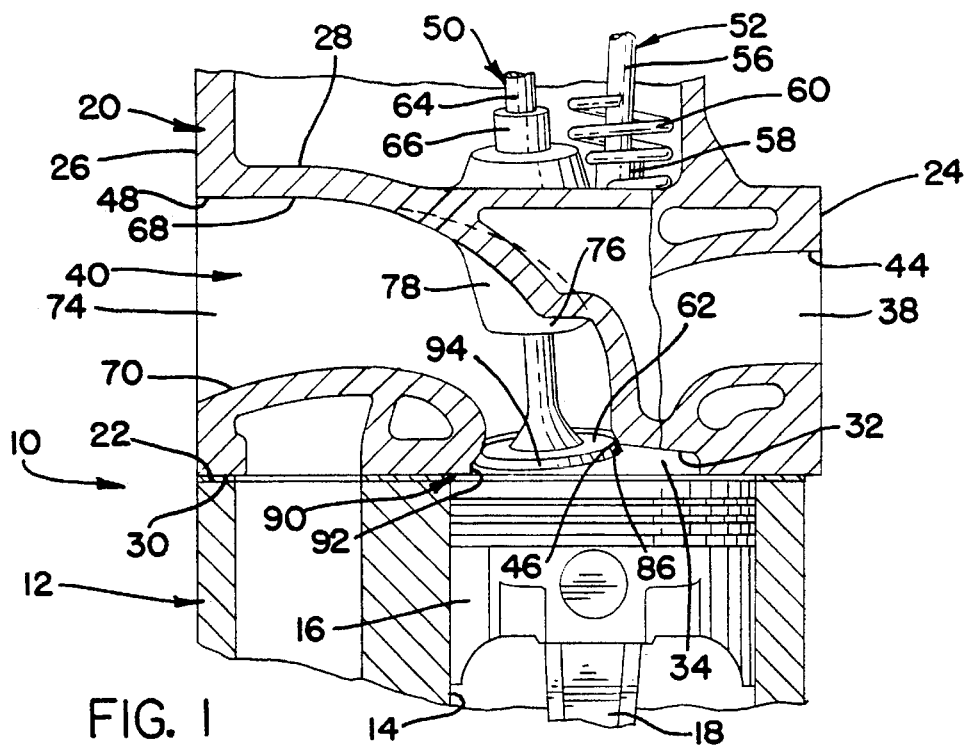
FIG. 1 is a sectional view through a cylinder head intake port of an internal combustion engine embodying features of the present invention.

Referring now to the drawings in detail, numeral 10 generally indicates an internal combustion engine constructed in accordance with the present invention. Engine 10 conventionally includes a cylinder block 12 having a plurality of cylinders 14, only one of which is shown. Pistons 16 are provided, one in each of the cylinders 14, and connecting rods 18 attach the respective pistons with a crankshaft, not shown, rotatably supported in the cylinder block 12.

A cylinder head 20 is mounted upon an upper end wall or deck 22 of the engine cylinder block 12 to thereby close the cylinders 14. The cylinder head 20 includes first and second side walls 24,26, respectively and top and bottom walls 28,30 the latter, bottom wall being seated atop the engine block deck 22.

At each cylinder location, a combustion chamber recess 32 is formed in the cylinder head bottom wall 30 opposite the top of its respective piston 16. The piston 16, cylinder 14 and cylinder head 20, including the recess 32, form a variable volume working and combustion chamber 34. Connecting with the combustion chamber 34 in the recess 32 are a spark plug opening 36, FIG. 2, an exhaust port 38 and an intake port 40 formed in accordance with the present invention.

The spark plug opening 36 conventionally receives a spark plug, not shown, having a spark plug gap operable within the combustion chamber 34. The exhaust port 38 extends from a circular exhaust valve seat 42 which opens to the combustion chamber 34, along a curved flow path to an exhaust opening 44 through the side wall 24 of the cylinder head 20 for connection to an exhaust manifold, not shown.

The intake port 40 extends from a circular intake valve seat 46 along a path to be subsequently described, to an inlet opening 48 through side wall 26 of cylinder head 20 for connection with an intake manifold, not shown. Poppet intake and exhaust valves 50,52, respectively, are provided for intake and exhaust ports 40 and 38. The exhaust valve includes a head 54 for sealing engagement with circular exhaust valve seat 42, the head being supported by a valve stem 56 carried in a valve guide 58 mounted within the top wall 28 of the cylinder head 20 for reciprocal movement therein. A biasing member such as compression spring 60 and a valve actuating assembly, not shown, are provided to actuate the exhaust valve in timed relation to the engine crankshaft rotation.

The intake valve 50 likewise includes a valve head 62 for sealing engagement with the intake valve seat 46. A valve stem 64 extends from the head 62 of each intake valve 50 and is reciprocably carried in a valve guide 66 mounted in the cylinder head 20. Like the exhaust valve 52, the intake valve 50 is actuated, in a known manner, through suitable valve actuation gear, not shown, in timed relation to the engine crankshaft rotation. The valves 50 and 52 operate to regulate the flow of intake charge into, and exhaust gas flow out of, the combustion chamber 34.

Figure 2:
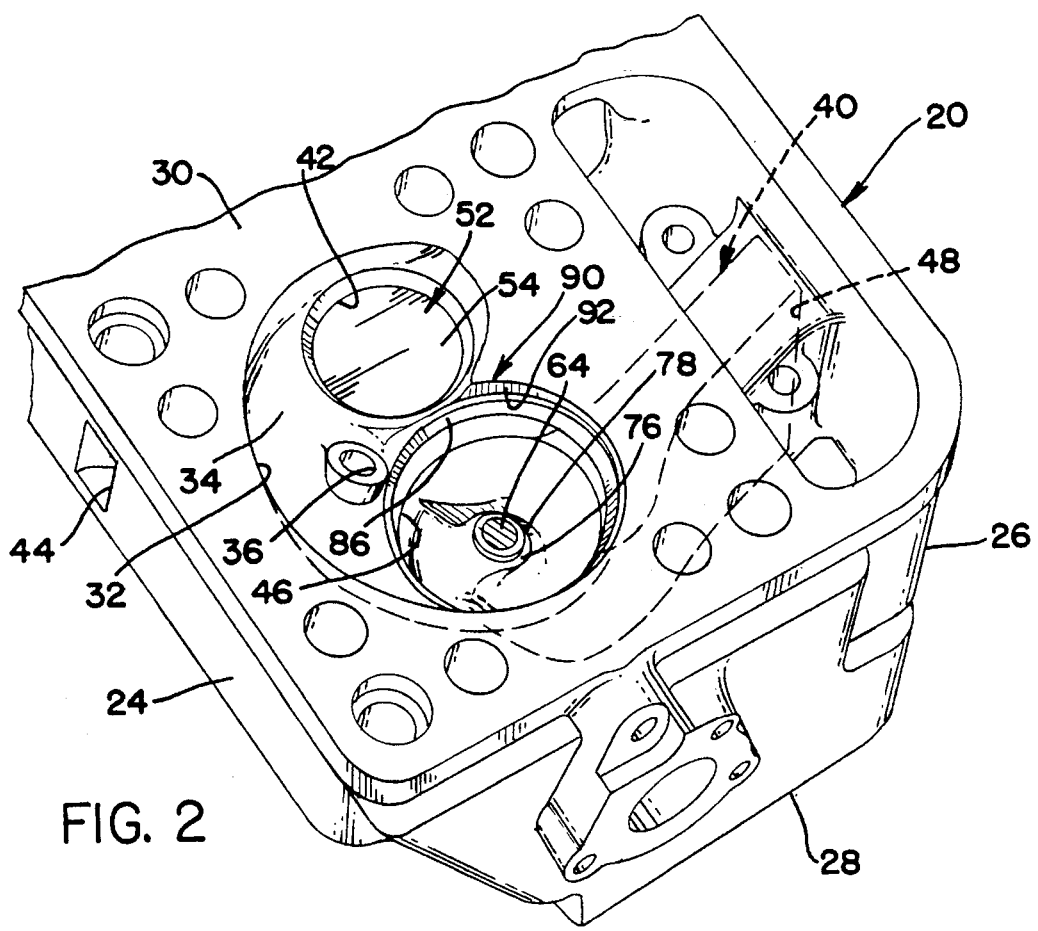
FIG. 2 is a view of the lower surface of the cylinder head of FIG. 1, partially in section and removed from the engine crank case.
Figure 3:
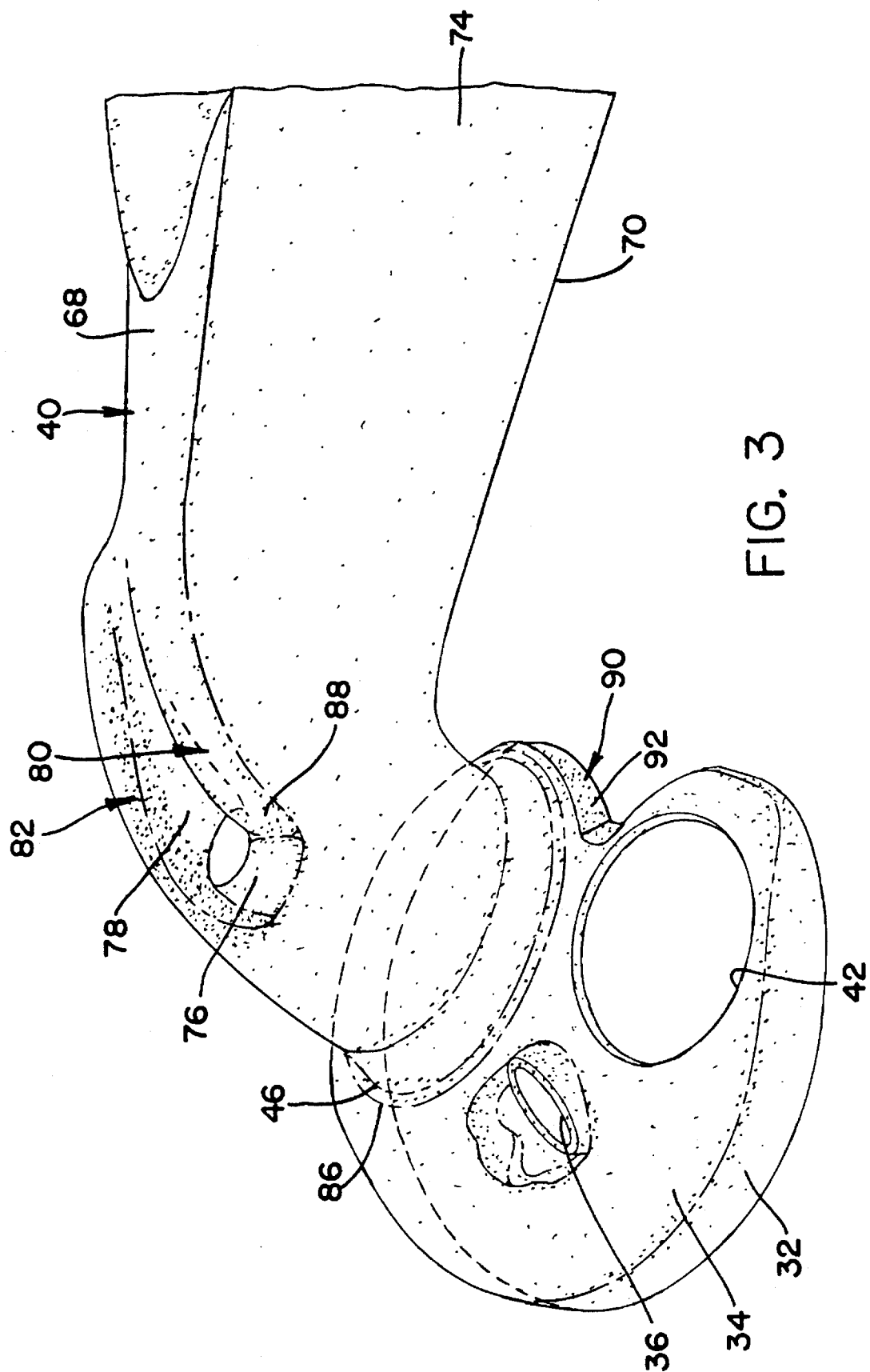
FIG. 3 is a perspective view of an intake port core useful to illustrate features of the present invention.

The configuration of the disclosed intake system is such as to develop a rotation, or swirl of the air/fuel intake charge, as it enters the combustion chamber 34, without unduly hindering the volumetric efficiency of the engine. In order to adequately visualize the shape of the intake port 40 shown within the cylinder head in FIGS. 1 and 2, FIG. 3 illustrates the configuration of a core model, or a portion thereof, which visually relates the features of the inlet port according to the desired shape as taught by the present invention. In enumerating the features of construction of the intake port 40, the corresponding features of the core will be given identical numerals to that of the intake port to clearly illustrate the relationship of these features to the actual intake port.

Extending from the inlet opening 48, the port 40 includes a passage surrounding surface which may, for descriptive purposes, be divided into four walls including an upper wall 68, a lower wall 70, and left and right side walls 72,74 respectively. The shape of the intake port may vary from circular to essentially rectangular, depending upon the particular engine application with the various top, bottom and side walls connected by more or less arcuate surfaces formed with both single and compound curvatures to extend smoothly inwardly from the inlet opening 48 to the intake valve seat 46. Thus it will be understood that the separation or dividing line between the associated walls of the inlet port 40 are not well defined and that the differing numerals are utilized primarily for descriptive purposes rather than the denotation of specific structure. It should also be noted that the specific shape of the inlet port 40 and its associated walls is not critical as affecting features of the invention, unless otherwise noted, except that it is desirable that a smooth flow path be provided for inlet charge flow efficiency.

Approaching intake valve stem 64 from the inlet opening 48, the intake port upper wall 68 is interrupted by a downwardly extending valve guide boss 76 which typically has an upstream-projecting hiring or guide vane 78 which effectively divides the inlet port 40 into two sides or flow paths 80,82. The vane 78 extends upwardly along the center of the upper wall 68 on either side of the valve guide 76 and stem 64 to effectively split the inlet charge flow as it moves in a downstream direction from the inlet 48 to an inlet opening 86 of the combustion chamber 34 thereby directing a smooth transition of intake charge around the downwardly extending guide boss 76.

Flow path 80 includes a downwardly angled ramp portion or guide wing 88 which extends from the upper wall 68 to a location adjacent the boss 76. At its lower end, the guide wing 88 merges smoothly with the terminal end of the boss 76. Adjacent flow path 82 is configured without a guide wing such that the direction of the incoming cylinder charge can proceed directly, without a change in flow direction, towards the inlet opening 86 through valve seat 46. As a result of the differing configurations of the inlet port flow paths 80,82, the following flow characteristics are achieved.

Figure 5A:
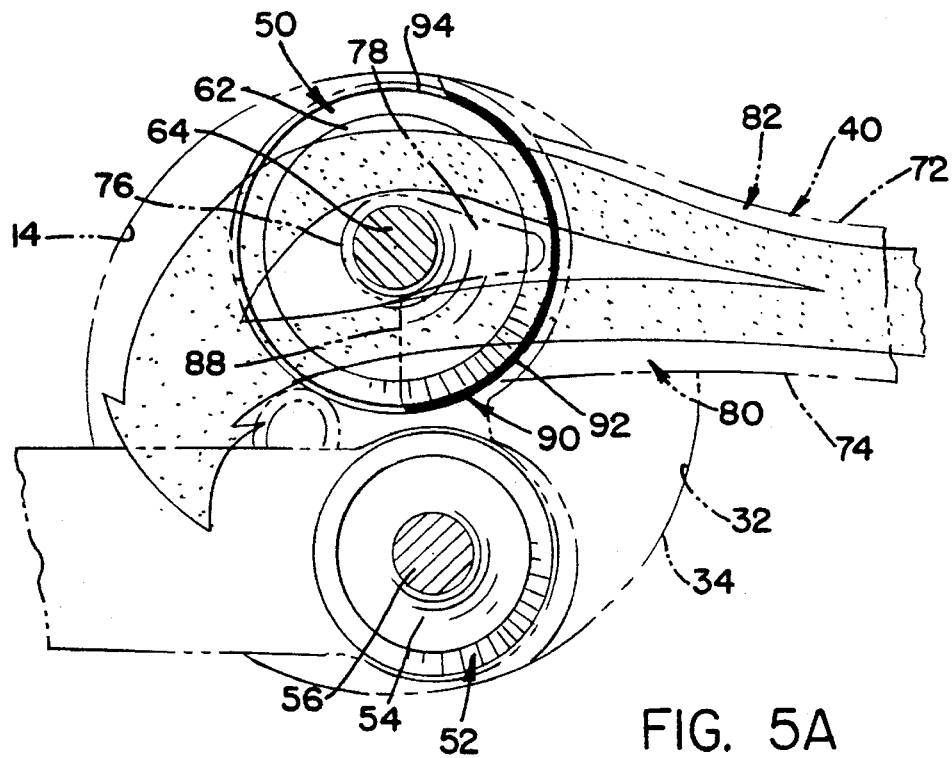
FIGS. 5A and 5B are partial, schematic sectional views, taken along line 5A—5A and 5B—5B of FIGS. 4A and 4B in modes of operation which correspond to FIGS. 4A and 4B respectively and illustrating intake charge flow through the intake port and into the combustion chamber.
Figure 5B:
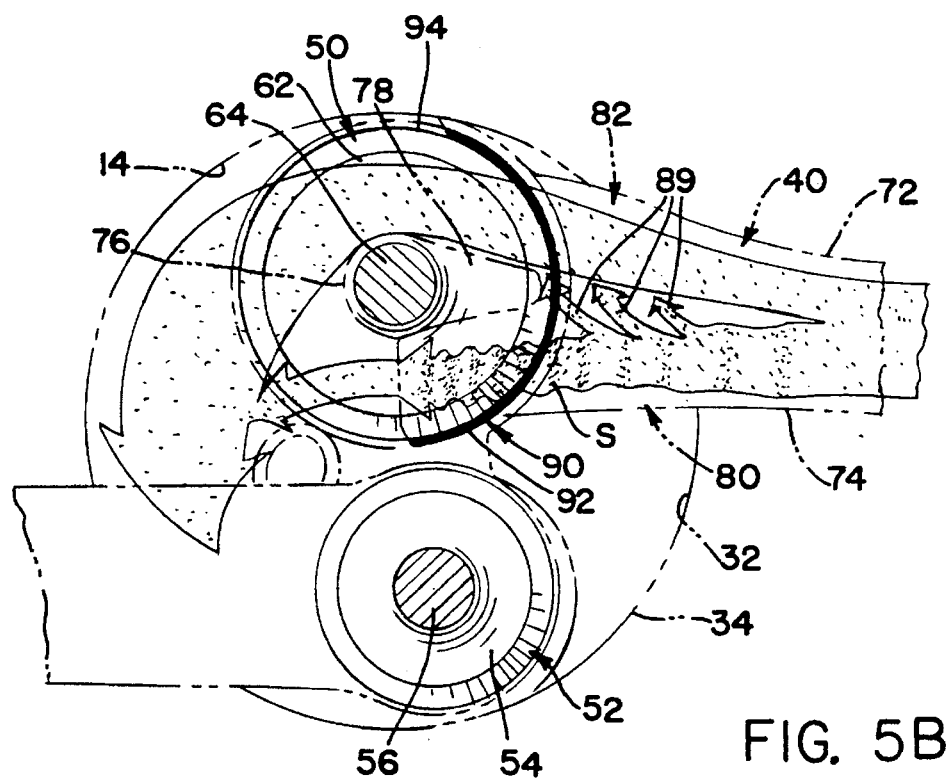

At high valve lift, high volume flow conditions, FIGS. 4B and 5B, as the inlet charge flows towards the inlet opening 86, the charge is divided by the guide boss 76 and associated guide vane 78 into two distinct flows, FIGS. 5A and 5B. Charge flowing in path 80 encounters the guide wing 88 as it approaches the inlet opening 86. The guide wing 88 imposes a directional change on the charge flow in path 80 which has the effect of slowing flow, indicated at "S" in FIGS. 4B and 5B, in path 80 slightly. As flow through the path 80 slows, relative to flow through path 82, a larger quantity of charge flow entering the cylinder is directed along intake port path 82, as indicated by the charge flow arrows 89 in FIG. 5B. As the charge is forced to flow primarily through the flow path 82 it is also forced to enter the combustion chamber 34 primarily along one side of the valve opening, as illustrated by the flow arrows, thereby inducing combustion enhancing swirl about the perimeter of the cylinder 14.

The effect of the guide wing 88 is to create combustion chamber swirl through the redirection of combustion charge entering the cylinder through the inlet opening 86. At such high degrees of valve lift, corresponding to high intake port flow rates, the guide wing effectively achieves the above redistribution of flow with little effect on the flow efficiency through the port.

Charge swirl is also desirable during low valve lift, low charge flow conditions when the guide wing has minimal effect on diverting the charge flow to induce such swirl. To achieve desired levels of charge swirl at low valve lift, a chamber shroud 90 is disposed about a portion of the inlet opening 86 opening, immediately downstream and adjacent the annular valve seat 42. The chamber shroud 90 includes a wall 92 which extends downwardly, into the combustion chamber 34, coaxial with the valve stem 64. The close proximity of the intake valve head outer edge 94 to the chamber shroud wall 92 effectively forces the charge air to enter the chamber primarily through the unblocked circumferential portion of the inlet opening 86, FIGS. 4A and 5A, forcing the charge to one side of the cylinder 14, inducing swirl thereabout. The inducement of inlet charge swirl in the cylinder 14 using the chamber shroud 90 is effective at those stages of valve lift in which the valve head travels axially adjacent the wall 92. As the valve lift and resultant charge flow increases, the valve head clears the chamber shroud 90, FIG. 4B, allowing unimpeded entry of the charge through the inlet opening 86 thereby minimizing the effects of the chamber shroud 90 on flow efficiency through the inlet port 40. Upon clearance of the chamber shroud 90 by the intake valve head 62, the shroud effect on charge swirl is minimal with the principal swirl inducement a result of the inlet port guide wing 88.

The present invention provides a fixed geometry engine cylinder intake port for use in internal combustion engines to provide cylinder charge swirl at both low and high degrees of valve lift and volumetric flow. The invention incorporates a combustion chamber inlet valve shroud which is operable at low valve lift and charge flow to induce swirl in the combustion chamber by forcing the incoming cylinder charge to one side of the cylinder as it passes through the inlet valve opening. The chamber shroud is configured to operate only under low lift-low flow conditions. As the inlet valve enters the high lift portion of the valve lift curve, the valve head clears the chamber shroud allowing unimpeded entry of the charge are into the cylinder through the inlet valve opening. As the chamber shroud becomes ineffective at inducing intake charge swirl, an inlet port guide wing operates to direct inlet charge to one side of the intake port as it enters the combustion chamber thereby inducing swirl within the cylinder under high lift-high volume conditions.

The foregoing description of the preferred embodiment has been presented for the purpose of illustration and description. It is not intended to be exhaustive nor is it intended to limit the invention to the precise form disclosed. It will be apparent to those skilled in the art that the disclosed embodiment may be modified in light of the above teachings. The embodiments were chosen to provide an illustration of the principles of the invention and of its practical application to thereby enable one of ordinary skill in the art to utilize the invention in various embodiments and with various modifications as are suited to the use contemplated. Therefore the foregoing description is considered exemplary rather than limiting and the true scope of the invention is that described in the following claims.

I claim:

1. In an internal combustion engine including a combustion chamber defined by a cylinder having a piston, an intake valve for regulating charge flow through an opening and into said combustion chamber and an exhaust valve for regulating exhaust gas out of said combustion chamber, a first apparatus for inducing charge swirl within said combustion chamber comprising a chamber shroud disposed in said combustion chamber including a circumferentially extending wall having an axially terminal end disposed in said combustion chamber and disposed about a portion of said valve opening, said wall effective to block ingress of said charge flow through a portion of said opening when said intake valve is in a first, low lift-low flow range of valve operation to thereby direct charge flow into said combustion chamber through one side of said opening to induce charge flow swirl in said chamber, and an intake system comprising an intake port extending from an inlet to said opening, said intake port defining first and second flow paths, said first flow path including a second apparatus for inducing charge swirl within said combustion chamber comprising a charge flow guide wing operable under conditions of high valve opening and high volumetric inlet charge flow to induce a directional change in charge flow traversing said first flow path resulting in an increase in charge flow through said second flow path to thereby direct charge flow into said combustion chamber through one side of said opening, inducing charge flow swirl in said chamber when said intake valve is in a second, high lift-high flow range of valve operation.

2. In an internal combustion engine, as defined in claim 1, said intake valve operable to extend into said combustion chamber beyond said terminal end of said circumferentially extending wall of said chamber shroud when said valve is in said second, high lift-high flow range of valve operation to thereby terminate said block age of said charge flow into said combustion chamber by said chamber shroud.

3. In an internal combustion engine including a combustion chamber defined by a cylinder having a piston, an intake valve for regulating charge flow through an opening into said combustion chamber and an exhaust valve for regulating exhaust gas out of said combustion chamber, a first apparatus for inducing charge swirl within said combustion chamber comprising a chamber shroud disposed in said combustion chamber including a circumferentially extending wall having an axially terminal end disposed in said combustion chamber and disposed about a portion of said valve opening, said wall effective to substantially block ingress of said charge flow through a portion of said opening when said intake valve is in a first, low lift, low volume flow range of valve operation to thereby direct charge flow into said combustion chamber through one side of said opening to thereby induce charge flow swirl in said chamber, and an intake port extending from an inlet to said opening, said intake port defined by first and second flow paths by a second apparatus for inducing charge swirl within said combustion chamber comprising a charge flow guide wing defined by a ramped portion extending into said first flow path and operable under conditions of high valve opening and high volumetric inlet charge flow to induce a partial directional change in charge flow traversing said first flow path towards said second flow path resulting in an increase in charge flow through said second flow path to thereby direct charge flow into said combustion chamber through one side of said opening, inducing charge flow swirl in said chamber.

4. In an internal combustion engine, as defined in claim 3, said intake valve operable to extend into said combustion chamber beyond said axially terminal end of said circumferentially extending wall of said chamber shroud when said valve is in said high lift, high flow volume range of valve operation to thereby terminate said blockage of said charge flow into said combustion chamber by said chamber shroud.

* * * * *